United States Patent
Inukai

(10) Patent No.: US 7,176,891 B2
(45) Date of Patent: Feb. 13, 2007

(54) POINTING DEVICE, KEYBOARD MOUNTING THE POINTING DEVICE, AND ELECTRONIC DEVICE PROVIDED WITH THE KEYBOARD

(75) Inventor: Atsuomi Inukai, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/780,423

(22) Filed: Feb. 12, 2001

(65) Prior Publication Data

US 2001/0015720 A1    Aug. 23, 2001

(30) Foreign Application Priority Data

Feb. 22, 2000  (JP) ............................. 2000-050441
Mar. 16, 2000  (JP) ............................. 2000-079329

(51) Int. Cl.
G09G 5/08   (2006.01)
G09G 5/00   (2006.01)

(52) U.S. Cl. .................. 345/161; 345/168; 345/184

(58) Field of Classification Search ........ 345/156–158, 345/160, 161, 168, 169, 173, 184
See application file for complete search history.

(56) References Cited

U.S. PATENT DOCUMENTS 5,065,146 A * 11/1991 Garrett ...................... 345/161
5,231,386 A * 7/1993 Brandenburg et al. ...... 345/174
5,467,108 A * 11/1995 Mimlitch .................... 345/161
5,489,900 A * 2/1996 Cali et al. ..................... 341/34
5,640,178 A   6/1997 Endo et al. ................. 345/161
5,754,167 A * 5/1998 Narusawa et al. .......... 345/161
5,774,113 A * 6/1998 Barnes ........................ 156/156
5,883,690 A * 3/1999 Meyers et al. .............. 345/161
6,040,823 A * 3/2000 Seffernick et al. ......... 345/168
6,115,030 A * 9/2000 Berstis et al. .............. 345/161
6,137,475 A * 10/2000 Ginn et al. .................. 345/161
6,208,328 B1 * 3/2001 Kawachiya et al. ........ 345/157
6,248,018 B1 * 6/2001 Kehlstadt et al. ............ 463/38
6,359,613 B1 * 3/2002 Poole .......................... 345/161
6,388,655 B1 * 5/2002 Leung ......................... 345/157
6,512,510 B1 * 1/2003 Maeda ........................ 345/168

FOREIGN PATENT DOCUMENTS

JP    A 8-87375    4/1996

* cited by examiner

*Primary Examiner*—Bipin Shalwala
*Assistant Examiner*—Jeff Piziali
(74) *Attorney, Agent, or Firm*—Oliff & Berridge, PLC

(57) ABSTRACT

A pointing device provided with a sensor substrate 1 having a flat board form, a stick member 22 vertically provided on the sensor substrate 1, and at least a pair of strain sensors 8a–8d arranged in symmetrical relation to each other with respect to the stick member 22. The sensor substrate 1 is formed with four slits 3b which allow deformation of the strain sensors 8a–8d during operation of the stick member 22. The slits 3b each have an L-shape and jointly form a cross-shaped intersecting area 7 in which the strain sensors 8a–8d are arranged.

20 Claims, 15 Drawing Sheets

FIG. 9A
FIG. 9B
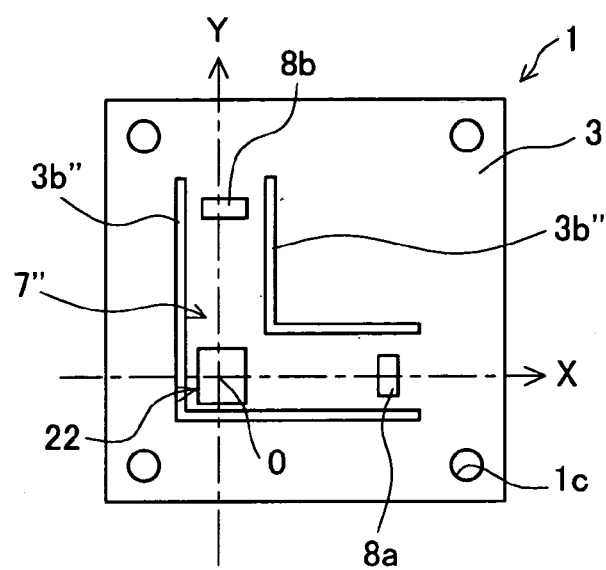
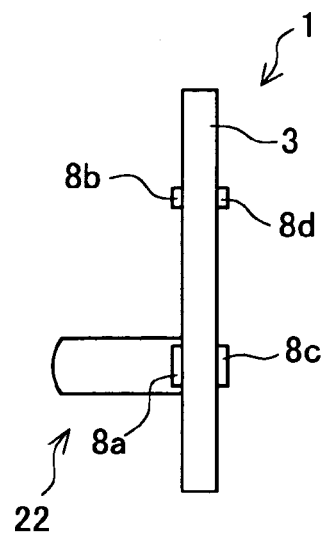

POINTING DEVICE, KEYBOARD MOUNTING THE POINTING DEVICE, AND ELECTRONIC DEVICE PROVIDED WITH THE KEYBOARD

BACKGROUND OF THE INVENTION

1. Field of the Invention

The present invention relates to a pointing device which is used to move a pointer or cursor on a display of an electronic device such as a computer, word processor, or the like to an arbitrary position on the display, and a keyboard mounting thereon the pointing device, and an electronic device provided with the keyboard.

2. Description of Related Art

In an electronic device provided with a display, such as a computer, word processor, or the like, generally, there is connected or mounted a pointing device whereby a pointer or cursor can be moved on a display to an arbitrary position without the need of key operations. One type of such the pointing device is arranged so as to detect the amount of strain which occurs when an operator places his finger tip on a stick member vertically provided in a keyboard, thereby applying a force on the stick member backward and frontward, or rightward and leftward, and then to move a pointer or cursor based on the detected strain amount.

In Japanese patent unexamined publication No. 8-87375, for example, as shown in FIG. 13, a pointing device is provided with a stick member 52 disposed at a center of a strain detecting substrate 51, strain sensors 53 arranged at four positions (only two of them are illustrated in FIG. 13), namely, a front, back, right, and left positions with respect to the stick member 52, and a base substrate 54 on which the strain detecting substrate 51 is attached with an internal gap. The strain sensors 53 detect the amount of strain (deformation) of the strain detecting substrate 51 generated at the gap with respect to the base substrate 54 when a force is applied on the stick member 52. This strain amount is subjected to a signal-processing in a processing circuit provided in the base substrate 54 side.

However, the above configuration that the base substrate 54 is attached to the strain detecting substrate 51 needs individual formation of print patterns on the substrates 51 and 54. Therefore, a patterning step should be repeated twice, resulting in deterioration in the productivity. The strain detecting substrate 51 also has to be attached by soldering to the base substrate 54 while a worker confirms positioning of the substrate 51 thereto. Accordingly, yields are likely to decrease due to soldering failures or the like during the attachment work. Furthermore, since the strain detecting substrate 51 is stacked on the base substrate 54, such a complex structure is prone to cause expensive assembling costs and malfunctions.

Furthermore, there has also been proposed a pointing device constructed, as shown in FIG. 14, such that a stick member 152 is disposed at a center of a strain detecting substrate 151, four strain sensors 153 are arranged at a front, back, right, and left positions with respect to the stick member 152, and notches 153a are formed with a laser beam irradiated to scan the strain sensor 153 from each end by a predetermined distance, thereby removing electric resistance (a trimming process), in order to prevent the inconsistency in an offset voltage outputted due to the sensors 153. The strain detecting substrate 151 is then attached to a base substrate 154 with a gap between the substrates 151 and 154. When a force is applied on the stick member 152, the amount of strain (deformation) of the substrate 151 at the gap with respect to the base substrate 154 is detected based on an electric current allowed to pass through the strain sensors 153, and the detected current values are signal-processed in a processing circuit provided in the base substrate 154 side.

However, the above structure has the following disadvantages. When the laser beam is irradiated to scan the strain sensor 153 from each end in the trimming process, the laser beam tends to concentrate at a point in a scanning stop position (an endpoint of the notch 153a), as shown in FIG. 15, which gives a large amount of heat of the laser beam to the endpoint of the notch 153a. The large heat amount would cause an excessive rise in the temperature of the electric resistance of a peripheral region 153b of the endpoint. This excessive temperature rise may bring the electric resistance into an unstable state as a resistance due to thermal stress, that is, into a state where a resistance value is liable to change with reference to temperatures, current values, and physical noises. As a result, the current i fluctuates by an amount corresponding to the change of the resistance value in the peripheral region 153b, operating as a noise element of detected current values, which may cause malfunctions in the electronic device mounting the pointing device.

SUMMARY OF THE INVENTION

The present invention has been made in view of the above circumstances and has an object to overcome the above problems and to provide a pointing device of simple structure capable of detecting the amount of strain on a single substrate, a keyboard mounting the pointing device, and an electronic device provided with the keyboard.

Furthermore, a second object of the present invention is providing a pointing device provided with a notch which may be formed by a trimming to prevent an electric resistance in a peripheral region of an endpoint of the notch from becoming unstable as a resistance, a keyboard mounting the pointing device, and an electronic device provided with the keyboard.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a pointing device including: a sensor substrate having a flat board form; a stick member vertically provided on the sensor substrate; at least a pair of strain sensors arranged in symmetrical relation to each other with respect to the stick member; and a slit formed on the sensor substrate near the strain sensor, the slit inducing an increase in an amount of deformation generated in the sensor substrate during operation of the stick member.

According to another aspect of the present invention, there is provided a keyboard provided with a plurality of keys arranged on a keyboard substrate and a pointing device disposed between predetermined two of the keys, the pointing device including: a sensor substrate having a flat board form; a stick member vertically provided on the sensor substrate; at least a pair of strain sensors arranged in symmetrical relation to each other with respect to the stick member; and a slit formed on the sensor substrate near the strain sensor, the slit inducing an increase in an amount of deformation generated in the sensor substrate during operation of the stick member.

According to another aspect of the present invention, there is provided an electronic device provided with a keyboard including: a plurality of keys arranged on a keyboard substrate and a pointing device disposed between predetermined two of the keys; a controller for controlling various data input with the keys on the keyboard; and a display for displaying the data under control by the controller; wherein the pointing device includes: a sensor substrate having a flat board form; a stick member vertically provided on the sensor substrate; at least a pair of strain sensors arranged in symmetrical relation to each other with respect to the stick member; and a slit formed on the sensor substrate near the strain sensor, the slit inducing an increase in an amount of deformation generated in the sensor substrate during operation of the stick member.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 9A is a plan view of the substrate;

FIG. 9B is a side view of the substrate;

DETAILED DESCRIPTION OF THE PREFERRED EMBODIMENTS

A detailed description of a preferred embodiment of a pointing device, a keyboard mounting the pointing device, and an electronic device provided with the keyboard embodying the present invention will now be given referring to the accompanying drawings.

Figure 1:
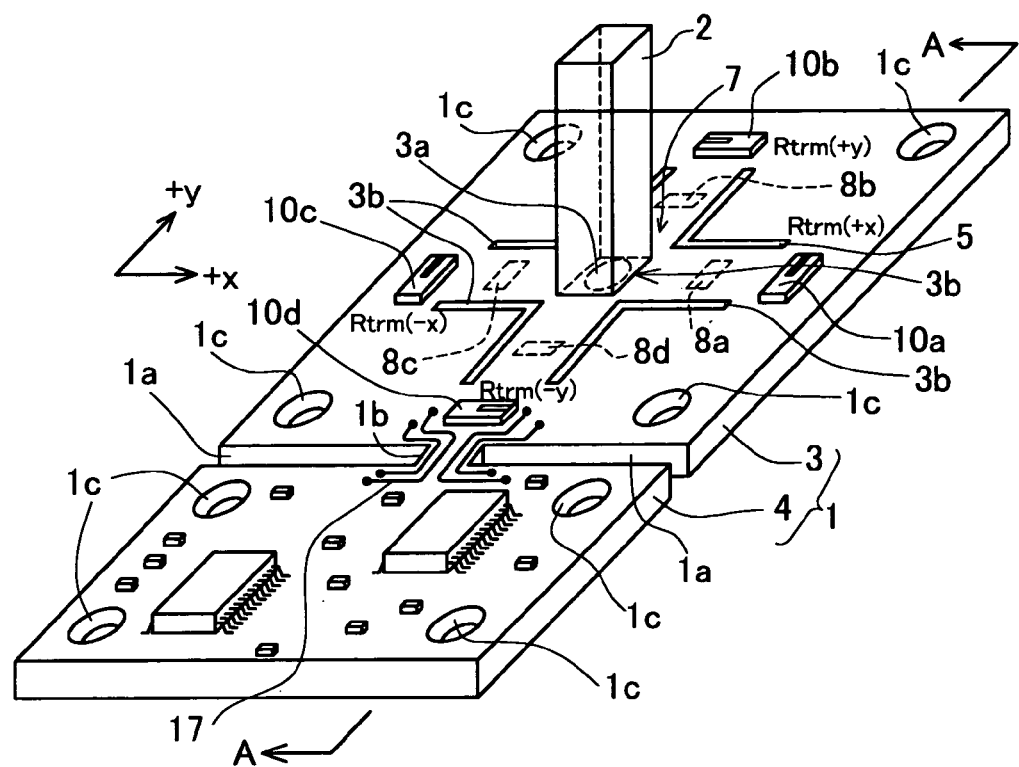
FIG. 1 is a perspective view of a pointing device in an embodiment according to the present invention.

A pointing device in the present embodiment is described below with reference to FIGS. 1 to 9. As shown in FIG. 1, the pointing device is provided with a sensor substrate 1 having the form of a rectangular board in plan view. This sensor substrate 1, on which a printed wiring (circuit) may be provided, is made of a flexible insulative material. It is to be noted that such insulative material may be selected from a metal plate such as a hollow metal substrate having an insulative layer formed thereon, resins, glass, ceramics, monocrystals such as silicon, epoxyglass, and the like.

The sensor substrate 1 is constructed of a strain detecting section 3 to be used for detecting the amount of strain and a signal processing section 4 for signal-processing the strain amount. Between the strain detecting section 3 and the signal processing section 4, cut-out portions 1a are formed extending from both sides of the sensor substrate 1 in the width direction, thereby to provide therebetween a connecting portion 1b having a narrower width than the substrate 1. If the stress is generated in the signal processing section 4 attached to a keyboard substrate 19 (see FIG. 4), the cut-out portions 1a and the connecting portion 1b function to prevent the stress from easily being transmitted to the strain detecting section 3. This configuration can ensure precise operations of sensors in the strain detecting section 3.

Figure 3:
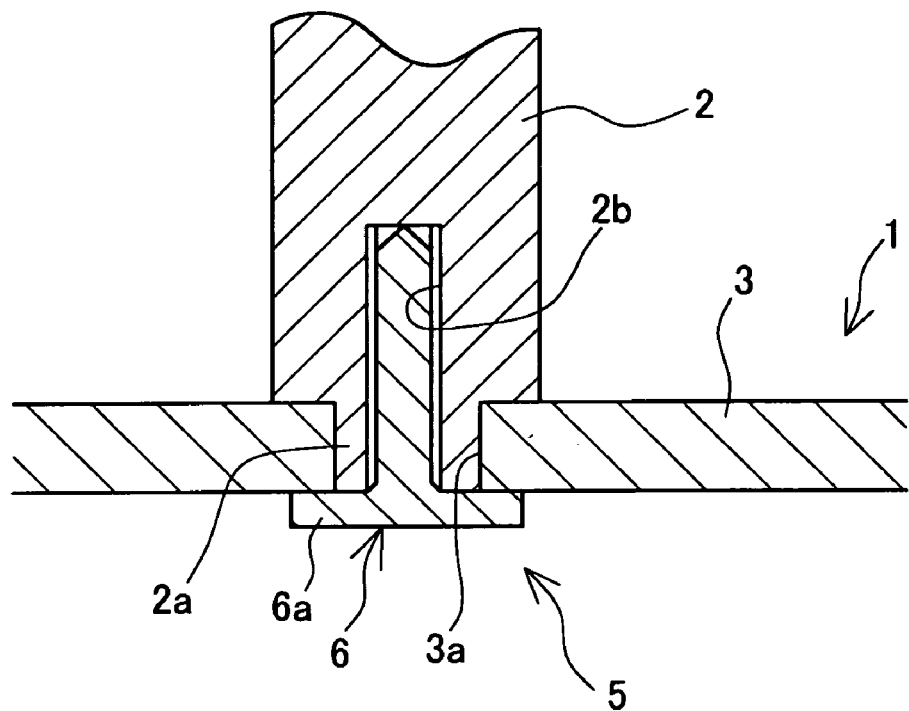
FIG. 3 is an explanatory view showing a state where a strut member is attached to a detecting section.
Figure 4:
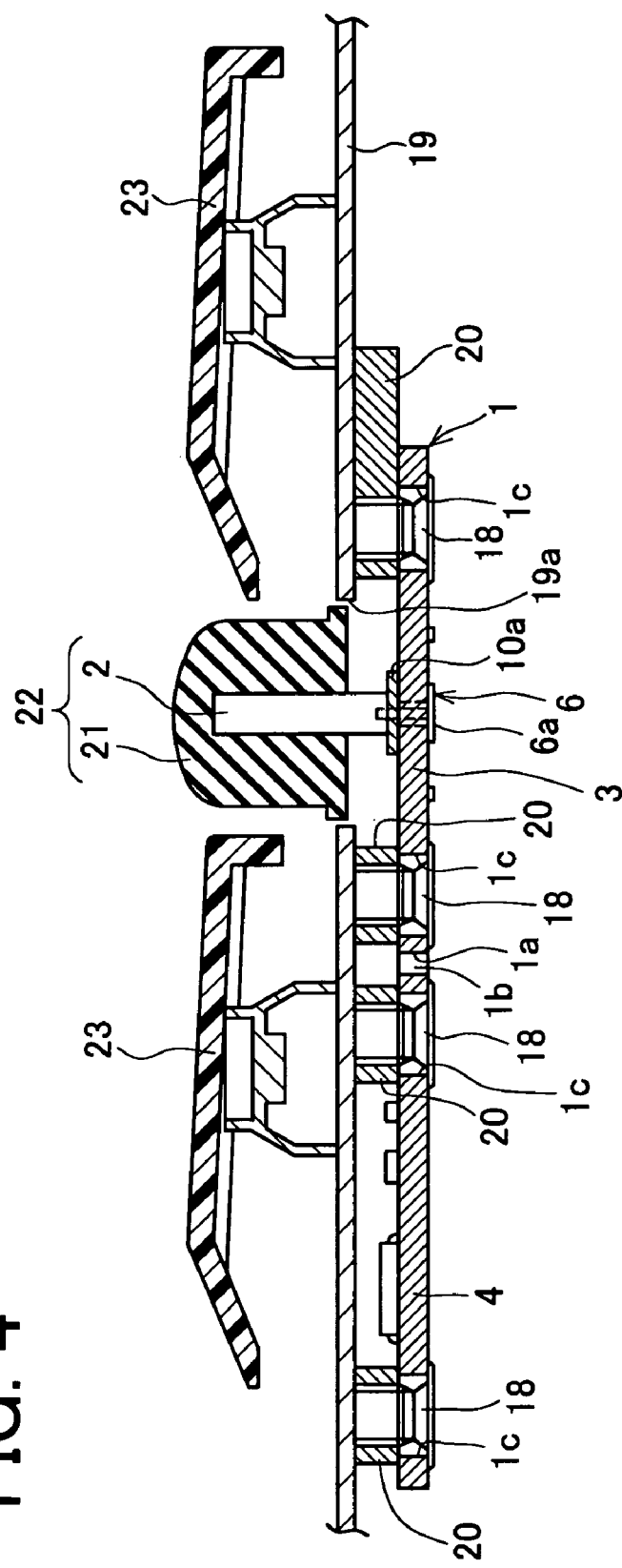
FIG. 4 is a sectional view of a sensor substrate attached to a keyboard substrate, taken along a line A—A in FIG. 1.

A strut member 2 is attached to the strain detecting section 3 at a center thereof. The strut member 2 is covered with a rubber cap 21 as shown in FIG. 4, both constituting a stick member 22, or a pointing stick, which is vertically provided on the sensor substrate 1 in engagement relation therewith. Since the stick member 22 is vertically engaged with the sensor substrate 1, the positioning of the stick member 22 with respect to the substrate 1 can be accurately effected and the resistance to lateral load can be enhanced. The attachment of the strut member 2 is made by means of an attachment mechanism 5 as shown in FIG. 3. This attachment mechanism 5 is constructed of an attachment hole 3a formed in the detecting section 3 of the substrate 1, an engagement portion 2a formed protruding from a lower end of the strut member 2 to be engaged in the attachment hole 3a, a female screw portion 2b internally formed in the strut member 2 at a center of the lower end face thereof, and a screw 6 engageable in the female screw portion 2b and provided with a head portion 6a having a larger diameter than the inner diameter of the attachment hole 3a.

The attachment mechanism 5 constructed as above can achieve high-accurate positioning of the strut member 2 with respect to the strain detecting section 3 through insertion of the engagement portion 2a of the strut member 2 in the attachment hole 3a, and enhance the resistance to lateral load and the rigidity to the strut member 2 attached to the strain detecting section 3 through tightening of the screw 6 in the female screw portion 2b in addition to the insertion of the engagement portion 2a in the attachment hole 3a.

Figure 2:
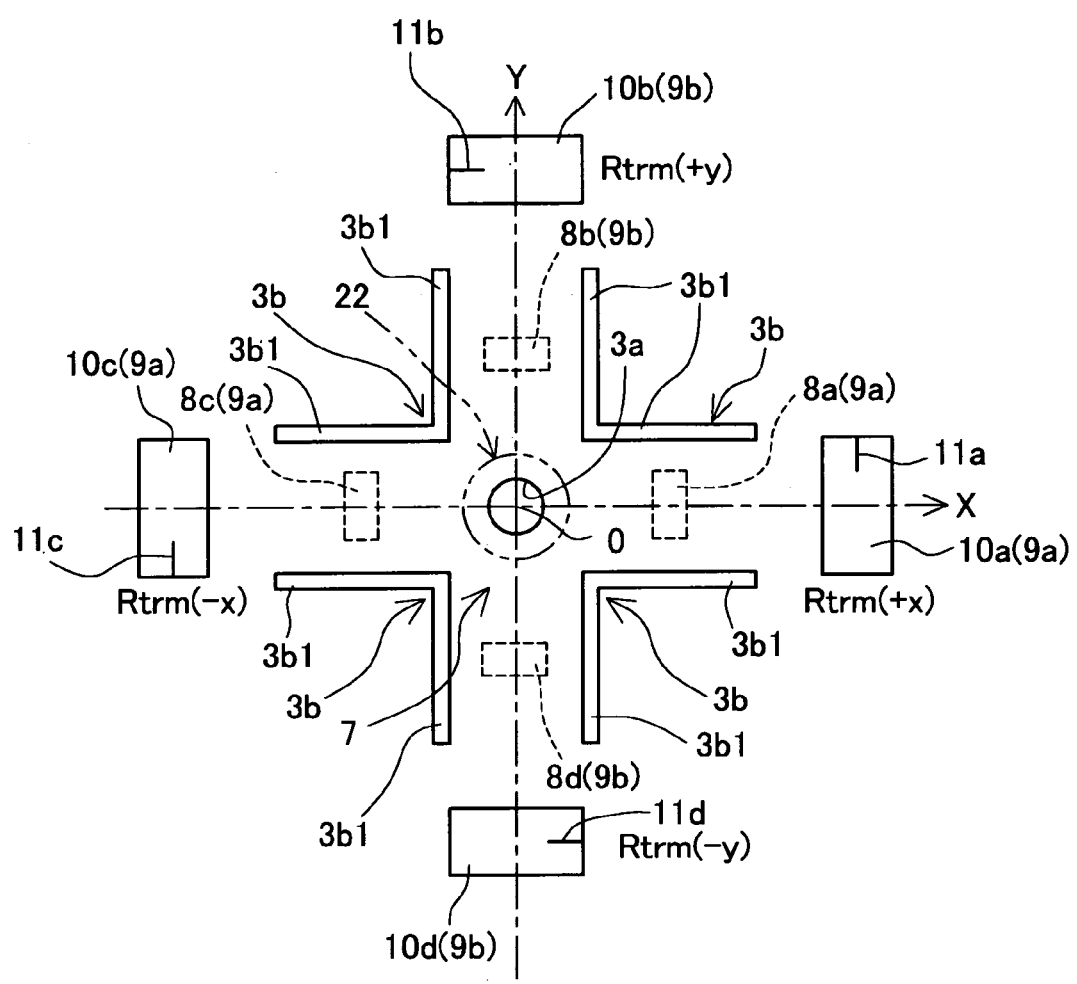
FIG. 2 is an explanatory view showing a positional relation of strain sensors and slits in the embodiment.

The strain detecting section 3 is formed with four slits 3b arranged symmetrically with respect to the attachment hole 3a (or the stick member 22) as shown in FIG. 2. To be more specific, assuming a coordinate system having an X-axis which indicates the width direction of the sensor substrate 1, a Y-axis which indicates the longitudinal direction of the same, and an origin point of the both axes which is aligned to the center of the attachment hole 3a, each slit 3b is of an L-shape in plan view having a pair of slit portions 3b1 each parallel to the X-axis or Y-axis and a corner portion at which the slit portions 3b1 are connected at an angle of 90°. In other words, two slit portions 3b1 are formed at both sides of each of strain sensors 8a–8d which will be mentioned later in detail. The slit 3b is therefore configured such that the slit portions 3b1 positioned between the adjacent two of the sensors 8a–8d are perpendicularly connected, thereby forming an L-shape. Each of the slits 3b is arranged with its corner facing the attachment hole 3a at a predetermined distance from the center point O. Thus, a cross-shaped intersecting area (hereinafter simply referred to as a cross area) 7 is formed along the X-axis and Y-axis with its center aligned with the attachment hole 3a. The above simple process of providing four slits 3b of an L-shape at 90° angular intervals around the stick member 22, thereby jointly forming the cross area 7, makes it possible to effectively deform or warp the portions of the sensor substrate 1 where the strain sensors 8a–8d are present.

Four strain sensors 8a–8d are provided on the back surface of the cross area 7. Those strain sensors 8a–8d are each made of a resistance material mainly composed of ruthenium dioxide or carbon which changes its resistance value with stress applied thereto. The sensors 8a–8d are formed by adhesion of such resistance material to the sensor substrate 1 by layer forming techniques such as a vacuum deposition method, a sputter method, a vapor phase deposition method, or the like, thereby forming the strain sensors 8a–8d. The strain sensors 8a–8d are simultaneously formed under the same condition by the layer forming techniques. Hence, the inconsistency in the characteristics of the sensors can be minimized and thus the detection accuracy with respect to the strain amount can be improved.

It is to be noted that the strain sensors 8a–8d are preferably made of a resistance material mainly composed of carbon. In this case, they can be formed on for example an epoxy-glass substrate, which may be applied with printed wiring and generally used as the sensor substrate 1, at temperatures below the resistible temperature of the epoxy-glass. Instead of the above layer forming techniques, the strain sensors 8a–8d may be formed by printing techniques using conductive ink or photomechanical techniques such as photolithography, etching, or the like.

The above strain sensors 8a–8d are arranged at 90° angular intervals around the attachment hole 3a, namely, at a side +X on the X-axis, a side +Y on the Y-axis, a side –X on the X-axis, and a side –Y on the Y-axis in this order. The sensors 8a–8d are formed to have a symmetrical shape and size about the corresponding X- or Y-axis in order to cancel the strain occurring symmetrically with respect to the X- or Y-axis.

On the upper surface of the strain detecting section 3 (sensor substrate 1), chip resistances 10a to 10d are arranged around the strain sensors 8a to 8d respectively. These chip resistances 10a to 10d are positioned out of the deformable portion of the cross area 7 so that each resistance value of the resistances 10a to 10d is not influenced by the deformation of the cross area 7. The chip resistances 10a to 10d each have an upper surface including a resistance region which may be cut by a laser beam or the like. The resistance region is irradiated with the laser beam or the like from an end toward the other in the longitudinal direction of the resistance 10a (10b, 10c, or 10d) to form a notch 11a (11b, 11c, or 11d). In this manner, a trimming process is performed on the chip resistances 10a–10d independently to cause the emergence of a resistance value corresponding to the resistance region except the notch 11a (11b, 11c, or 11d).

The chip resistances 10a to 10c are disposed on the X-axis or Y-axis. The chip resistances 10a and 10c positioned on the X-axis are formed with the notches 11a and 11c in symmetrical relation to each other with respect to the X-axis. The chip resistances 10b and 10d positioned on the Y-axis are formed with the notches 11b and 11d in symmetrical relation to each other with respect to the Y-axis. Thus, each pair of chip resistances 10a and 10d or 10b and 10d disposed on the same axis can mutually cancel the changes of resistance values caused by the deformation generated in the outside of the cross area 7.

Figure 5:
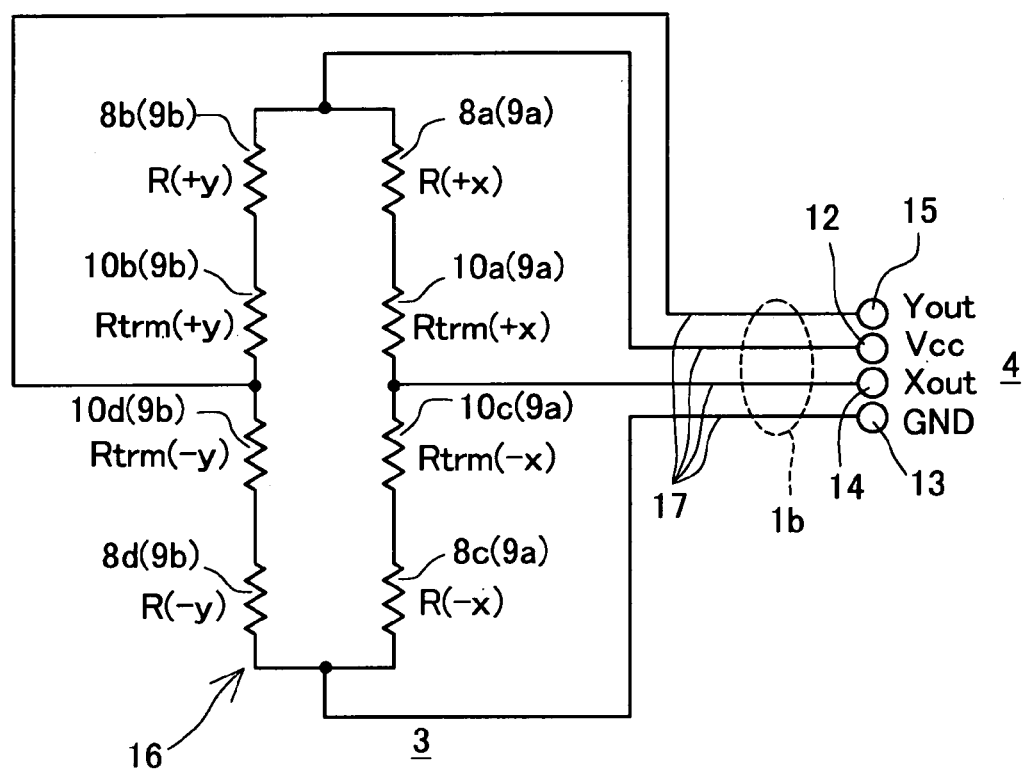
FIG. 5 is an explanatory view showing a connecting relation between the strain sensors and chip resistances.

The above chip resistances 10a to 10d are connected in series with the strain sensors 8a to 8d respectively as shown in FIG. 5. These chip resistances 10a to 10d and the strain sensor 8a to 8d are used as circuit elements of a bridge circuit 16.

To be more specific, a power source terminal 12 which is applied with a power supply voltage of 5V, for example, is connected between the strain sensors 8a and 8b. A GND terminal 13 is connected between the strain sensors 8c and 8d. An X-axis output terminal 14 is connected between the strain sensors 8a and 8c. A Y-axis output terminal 15 is connected between the strain sensors 8b and 8d. Among the sensors 8a–8d and the chip resistances 10a–10d constituting the bridge circuit 16, the sensors 8a and 8c, the chip resistances 10a and 10c each disposed on the X-axis, and the X-axis output terminal 14 jointly constitute an X-side transducer 9a for detecting an extent of deformation in the X-axis direction, while the sensors 8b and 8d, the chip resistances 10b and 10d, and the Y-axis output terminal 15 jointly constitute a Y-side transducer 9b for detecting an extent of deformation in the Y-axis direction. In addition, a combination of both the outputs from the transducers 9a and 9b constitutes a Z-side transducer for detecting the stain amount in a Z-axis direction.

The terminals 12–15 are disposed in the signal processing section 4. These terminals 12–15 are connected to the bridge circuit 16 provided on the strain detecting section 3 through printed wiring 17 formed on the connecting portion 1b having a narrow width between the cut-out portions 1a as shown in FIG. 1. The terminals 12–15 are each connected to a signal processing circuit having an amplifier or the like mounted on the signal processing section 4. The signal processing circuit amplifies each signal output of the transducers 9a and 9b to output it as a strain amount detection signal to the outside of the sensor substrate 1.

The signal processing section 4 mounting the above signal processing circuit is formed with mounting holes 1c at four corners thereof. Similarly, the strain detecting section 3 is formed with mounting holes 1c at four corners thereof. In each of those mounting holes 1c, a screw member 18 is inserted to attach the sensor substrate 1 constructed of the strain detecting section 3 and the signal processing section 4 to the back surface of the keyboard substrate 19 as shown in FIG. 4. A plurality of spacer members 20 are disposed between the sensor substrate 1 and the keyboard substrate 19. The spacer members 20 produce a predetermined space between the sensor substrate 1 and the keyboard substrate 19, thereby to prevent circuit components mounted on the sensor substrate 1 from making contact with the keyboard substrate 19.

Figure 7:
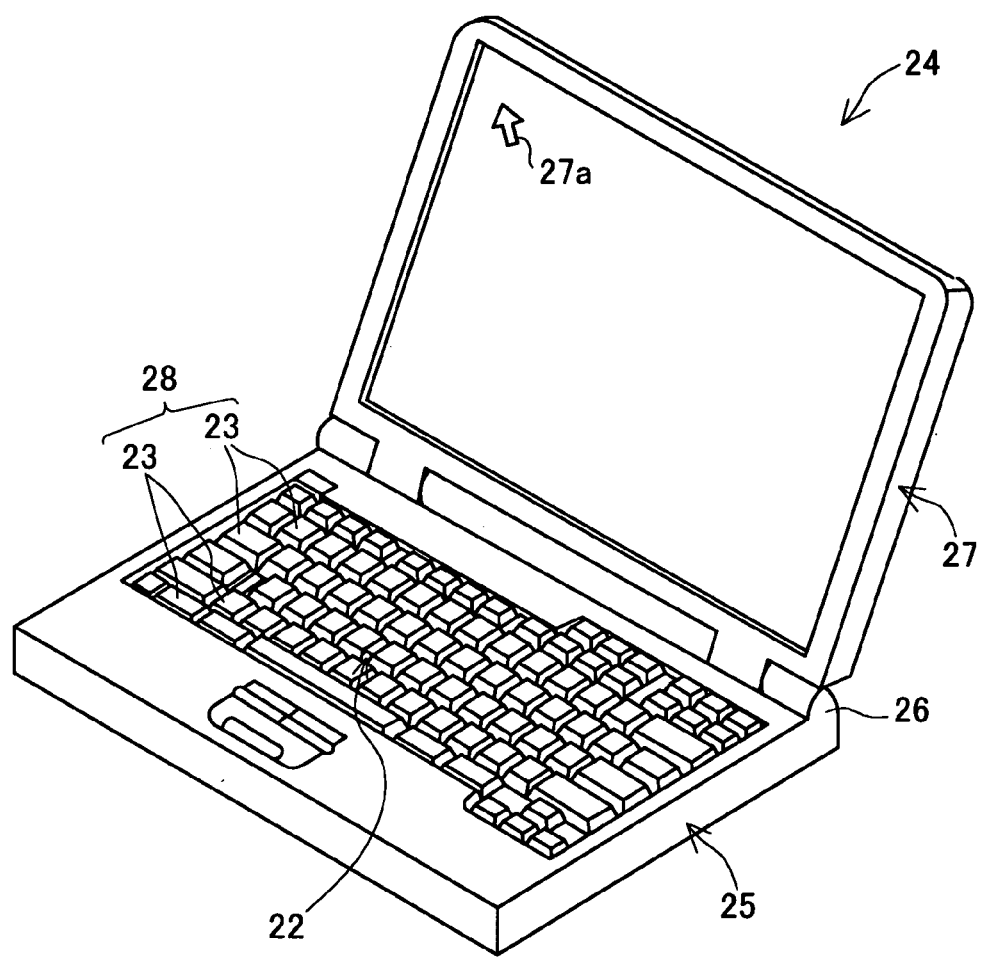
FIG. 7 is a perspective view of the electronic device of FIG. 6.

A hole 19a for a stick member is provided in the keyboard substrate 19 to which the sensor substrate 1 is attached in the above-mentioned manner. This stick hole 19a is disposed between keys 23 and 23 arranged on the keyboard substrate 19, for example, the keys on which letters "G" and "H" are printed respectively. The stick hole 19a is designed to have a predetermined opening diameter capable of preventing the stick member 22 from making contact with the keyboard substrate 19 even if the stick member 22 is tilted in any directions; forward and backward, and rightward and leftward. These sensor substrate 1 and the keyboard substrate 19 are mounted on an electronic device 24 such as a notebook-sized personal computer or a word processor as shown in FIG. 7.

Figure 6:
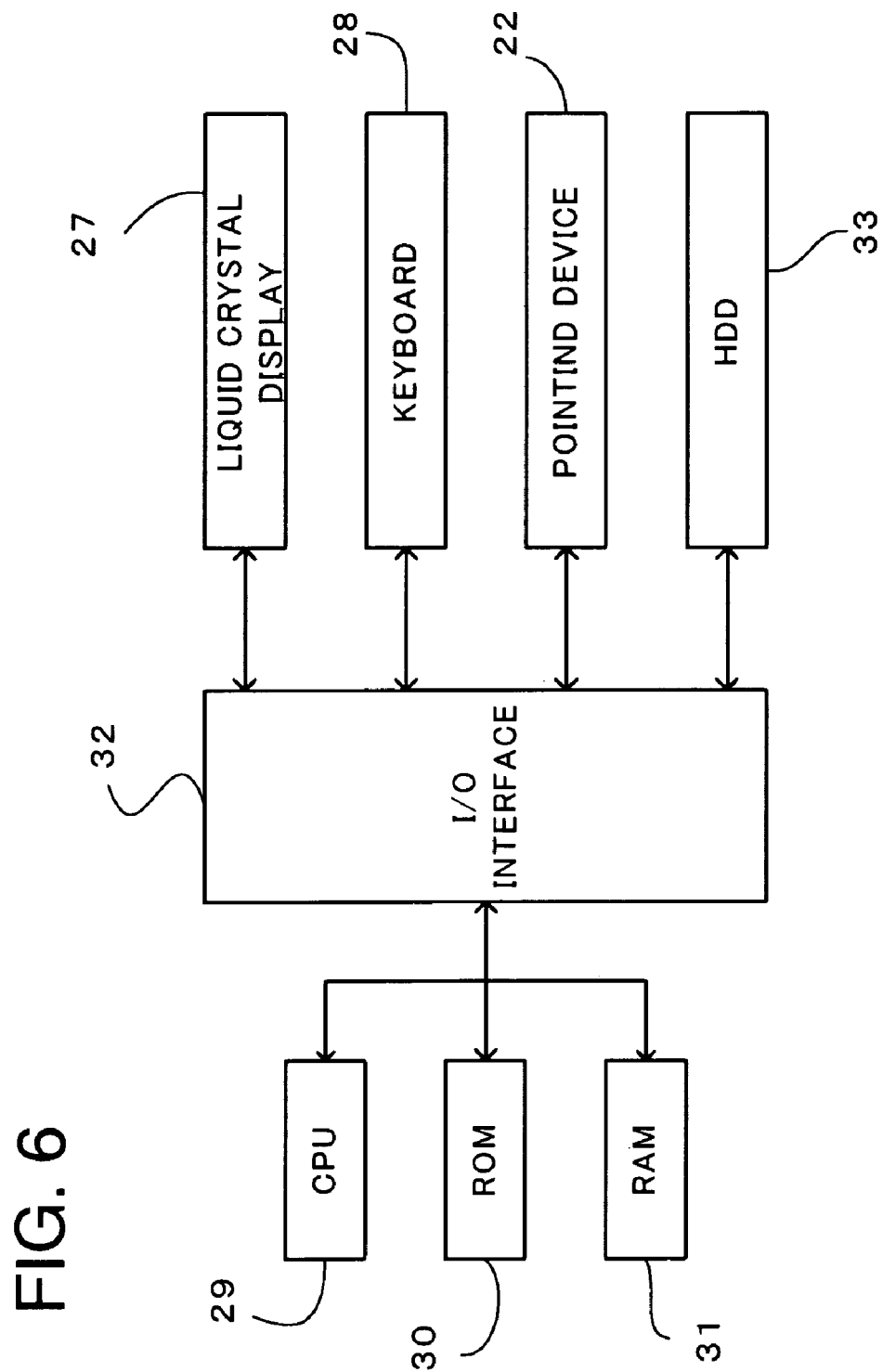
FIG. 6 is a block diagram of an electronic device in the embodiment.

The electronic device 24 includes a main unit 25 and a liquid crystal display (LCD) 27. The LCD 27 is pivotably supported to open/close with respect to the main unit 25 by a hinge 26 provided in a side end of the main unit 25. The main unit 25 is provided at its upper face with a keyboard 28 constructed of a plurality of keys 23. The stick member 22 is arranged at substantially the center of the keyboard 28. The main unit 25 internally holds, as shown in FIG. 6, a circuit board on which a CPU 29, a ROM 30, a RAM 31, an input/output (I/O) interface 32, and others are provided. A hard disc device (HDD) 33 is also mounted as a recorder in the main unit 25. The I/O interface 32 is connected to the HDD 33, the stick member 22, the keyboard 28, and the LCD 27, and others. This makes it possible to exchange data between the connected components and the CPU 29 and others in the circuit board.

The ROM 30 and the HDD 33 has stored a pointing control program which is executed at input or edition of data. When the cross area 7 is deformed in accordance with the operation amount and direction of the stick member 22, the transducers 9a and 9b detect the deformation amount of the cross area 7. Under the pointing control program, the detection signals from the transducers 9a and 9b are processed to determine the moving direction and speed of an arrow pointer 27a displayed on the LCD 27 in FIG. 7, and the pointer 27a is caused to move based on the determined movement conditions. Furthermore, if the detection signals from the transducers 9a and 9b represent more than a predetermined amount, the above program processes to establish a state where an operation signal representing a click has been input.

The pointing device having the above structure is produced in the following manner. A flat board made of materials for a printed circuit board such as epoxy-glass or the like is cut to produce the sensor substrate 1 with a predetermined size and shape shown in FIG. 1. Then, the substrate 1 is subjected to a punching process using for example a press machine to form the cut-out portions 1a, the mounting holes 1c, the attachment hole 3a, and the slits 3b. It is to be noted that the cut or punched portions may be formed in a cutting process using a water jet or the like.

After the formation of the outer shape of the sensor substrate 1, an undercoat material is applied to the lower surface of the sensor substrate 1 by means of a spin coater or roll coater to thereby form an under coat layer. Sequentially, a gauge layer which forms the strain sensors 8a–8d are formed on the under coat layer by layer forming techniques such as a vacuum deposition method, a sputter method, a vapor phase deposition method, or the like, and a photosensitive resist layer or film is applied on the gauge layer. Then, photolithography and etching processes are carried out to form a resist pattern. Using this resist pattern as a mask, a strain layer pattern is formed. The resist pattern is then removed and a protection layer is formed of an organic insulative material. Thus, the strain sensors 8a–8d are formed. During formation of the strain sensors 8a–8d, the print wiring 17 and others may be simultaneously formed.

Upon completion of formation of the strain sensors 8a–8d and the print wiring 17, the chip resistances 10a–10d and various circuit components are mounted on the sensor substrate 1 and a trimming process is performed in the following manner. The sensor substrate 1 is first set in a laser processing machine. The laser processing machine is operated to emit a laser beam to irradiate the upper surface of the chip resistance 10a while a combined resistance value [R(+X)+Rtrm(+X)] of the strain sensor 8a and the chip resistance 10a connected in series with the sensor 8a as shown in FIG. 5 is measured. The laser beam is allowed to move its irradiation point from an end toward the other end of the chip resistance 10a, thereby forming a notch 11a with a predetermined length in the resistance 10a as shown in FIG. 2, whereby to reduce the resistance value Rtrm(+X) of the resistance 10a. When the combined resistance value [R(+X)+Rtrm(+X)] is reduced to a predetermined value, the irradiation of the laser beam is stopped. The trimming process with respect to the resistance 10a is completed.

Subsequently, the trimming process is carried out with respect to the other chip resistances 10b–10d in the same manner as above to regulate all the combined resistance values [R(+Y)+Rtrm(+Y)], [R(−X)+Rtrm(−X)], and [R(−Y)+Rtrm(−Y)] as well as [R(+X)+Rtrm(+X)] to predetermined values. As a result of this, the inconsistency in an offset voltage caused by the sensors 8a–8d can be removed, thereby facilitating a signal processing on the detection signals output from the X-axis output terminal 14 and the Y-axis output terminal 15 in relation to the strain amount.

Next, as shown in FIG. 3, the engagement portion 2a of the strut member 2 is fit in the attachment hole 3a of the sensor substrate 1, and the screw 6 is inserted from the lower surface of the substrate 1 into the female screw portion 2b of the strut member 2. The screw 6 is then tightened to fix the strut member 2 to the substrate 1. After that, as shown in FIG. 4, the rubber cap 21 is put on the strut member 2 from above, constituting the stick member 22. The thus structured substrate 1 is attached to the back surface of the keyboard substrate 19 through the spacer members 20. During this attachment, even if stress is generated in the signal processing section 4, the stress will hardly be transmitted to the strain detecting section 3. This is because, as mentioned above, the strain detecting section 3 and the signal processing section 4 are connected through the narrow connecting portion 1b. Subsequently, the keyboard substrate 19 is assembled in the main unit 25 to form the keyboard 28, and the LCD 27 and others are attached to the main unit 25, thus completing the assembly of the electronic device 24, as shown in FIG. 7.

The electronic device 24 provided with the sensor substrate 1 as mentioned above is used for information processing of various kinds, such as word processing, tabular calculation and drawing processing, etc. Input of the word data and numerical data to be used in the information processing is made by operation of the keys 23 on the keyboard 28, without operating the stick member 22. During data input or edition and others, on the other hand, the stick member 22 is mainly operated to move the pointer 27a to an arbitrary position on the screen of the LCD 27.

While the stick member 22 is not operated and any stress is not applied, each resistance value of the strain sensors 8a–8d is unchanged. This is because the strain sensors 8a–8d are arranged in symmetrical relation to each other about the X-axis or Y-axis as shown in FIG. 2. Thus, the signal outputs from the X-axis output terminal 14 (X-side transducer 9a) and the Y-axis output terminal 15 (Y-side transducer 9b) in FIG. 5 maintain predetermined voltages. The CPU 29 in FIG. 6 having captured the signal outputs as a detection signal of the strain amount recognizes that the stick member 22 is not operated and keeps the pointer 27a in a pause state.

When an operator applies a force on the stick member 22 to tilt toward the plus sides in the X-axis and the Y-axis directions, for example, the cross area 7 is deformed in correspondence to the operating direction and amount of the stick member 22, and thus is deformed. At this time, when the stick member 22 is operated under high pressure, large lateral load may be generated in the connecting portion between the stick member 22 and the sensor substrate 1. However, since the stick member 22 is securely fixed to the substrate 1 with the attachment mechanism 5 as above, the stick member 22 is not detached from the substrate 1.

The deformation of the cross area 7 induced as above causes a tensile strain in the strain sensor 8$a$ positioned on the plus side of the X-axis, increasing the resistance value thereof, while causing a compressive strain in the strain sensor 8$c$ positioned on the minus side of the X-axis, decreasing the resistance value thereof. In regard to the strain sensor 8$b$ placed on the plus side of the Y-axis, the resistance value of a portion positioned on the right of the Y-axis increases due to the tensile strain, while the resistance value of another portion positioned on the left of the Y-axis decreases due to the compressive strain. Similarly, in regard to the strain sensor 8$d$ placed on the minus side of the Y-axis, the resistance value of a portion positioned on the right of the Y-axis increases due to the tensile stress, while the resistance value of another portion positioned on the left of the Y-axis decreases due to the compressive stress.

Consequently, the resistance values of the strain sensors 8$a$–8$d$ change, and the signal outputs from the X-axis output terminal 14 (X-side transducer 9$a$) and the Y-axis output terminal 15 (Y-side transducer 9$b$) change accordingly. The signal outputs are amplified to be used as the strain amount detection signal. This detection signal is then captured in the CPU 29 (FIG. 6) which executes the pointing control program, and used for determination of the moving direction and the moving speed of the pointer 27$a$ on the display screen 27.

The strain sensors 8$a$–8$d$ being connected in series with the chip resistances 10$a$–10$d$, the above signal outputs may also change in response to changes of the resistance values of the chip resistances 10$a$–10$d$. However, the chip resistances 10$a$–10$d$ are positioned out of the deformed portion of the cross area 7, so that the resistance values of the resistances 10$a$–10$d$ will not change by the influence of the deformation of the cross area 7 even when it is largely deformed by the stick member 22. Accordingly, the signal outputs precisely correspond to the changes of the resistance values of the strain sensors 8$a$–8$d$. The operator therefore can move the pointer 27$a$ in the intended speed and direction and stop it correctly.

As described above, the pointing device in the present embodiment is provided with the sensor substrate 1 having a flat board form, the stick member 22 vertically provided on the substrate 1, and at least a pair of strain sensors 8$a$–8$d$ positioned symmetrically about the stick member 22, as shown in FIG. 1. The substrate 1 is provided with the slits 3$b$ which allow the strain sensors 8$a$–8$d$ to become deformed in response to the operation of the stick member 22.

According to the structure in the present embodiment, the sensor substrate itself is allowed to deform through the slits, so that a single sensor substrate can be used as both of a conventional strain detecting substrate used for detecting the deformation amount (quantity) and a base substrate used for processing a detection signal of the deformation amount. This makes it possible to provide a pointing device with a more simple structure than the conventional one and to reduce the number of manufacturing steps, thereby enabling enhancement of productivity and yield and also cost reduction. Furthermore, since the slits may be changed in shape and size, the deformation due to the operation of the stick member can be maximized in correspondence to each of various sensor substrates. As a result, large accurate outputs can be easily obtained.

The sensor substrate is a substrate capable of having printed wiring thereon, and a signal processing circuit is mounted on this substrate. Therefore, a pattern including the signal processing circuit can be formed by patterning.

In addition, the electronic device in the present embodiment including the above structured pointing device is superior in operability, enabling correct input operation.

It is to be noted that "symmetrical with respect to the stick member 22" in the present embodiment indicates that the strain sensors 8$a$–8$d$ are arranged at equal distances from the stick member 22 in the directions of the X-axis and the Y-axis respectively. The slits 3$b$ are each formed in an L-shape as viewed in plan, but not limited thereto. Any shapes may be adopted if only the slits allow the strain sensors 8$a$–8$d$ to become deformed in response to the operation of the stick member 22.

Figure 8:
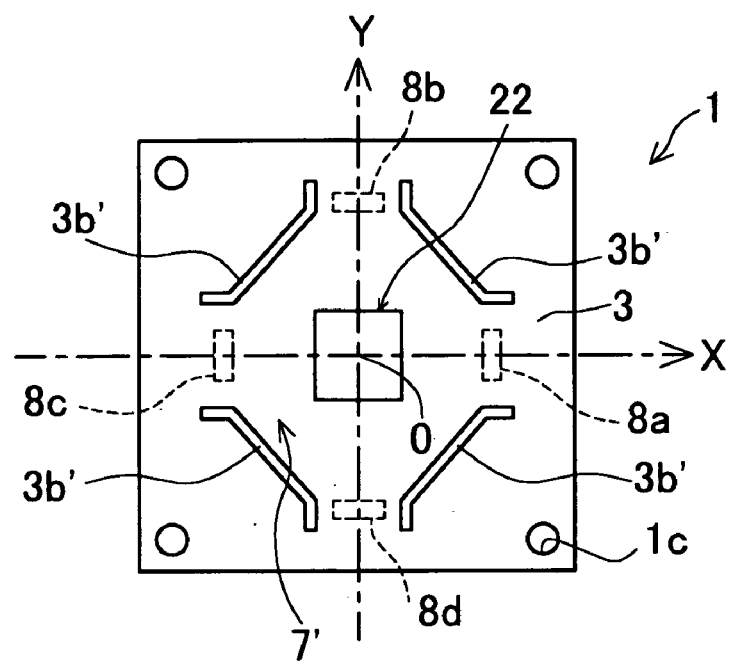
FIG. 8 is a plan view of the sensor substrate.

Accordingly, the strain detecting section 3 of the sensor substrate 1 may be constructed, for example, as shown in FIG. 8. That is, the sensors 8$a$–8$d$ are arranged in the positions of a plus side on the X-axis, a plus side on the Y-axis, a minus side on the X-axis, and a minus side on the Y-axis, respectively, and slits 3$b'$ each having an I-shape in plan view are provided between each adjacent pair among the strain sensors 8$a$–8$d$, thereby forming an intersecting area 7' having a substantially rectangular shape which allows the strain sensors 8$a$–8$d$ to deform.

Alternatively, as shown in FIGS. 9A and 9B, for example, the strain detecting section 3 of the sensor substrate 1 may be provided with the strain sensors 8$a$ and 8$c$ positioned on the upper and lower surfaces of the substrate 1 and at the plus side on the X-axis with the stick member 22 centered and the strain sensors 8$b$ and 8$d$ similarly positioned at the plus side on the Y-axis. In this case, a small L-shaped slit 3" and a large L-shaped slit 3" are formed so as to surround the stick member 22, thereby forming an L-shaped intersecting area 7" which allows the strain sensors 8$a$–8$d$ to deform.

Figure 10:
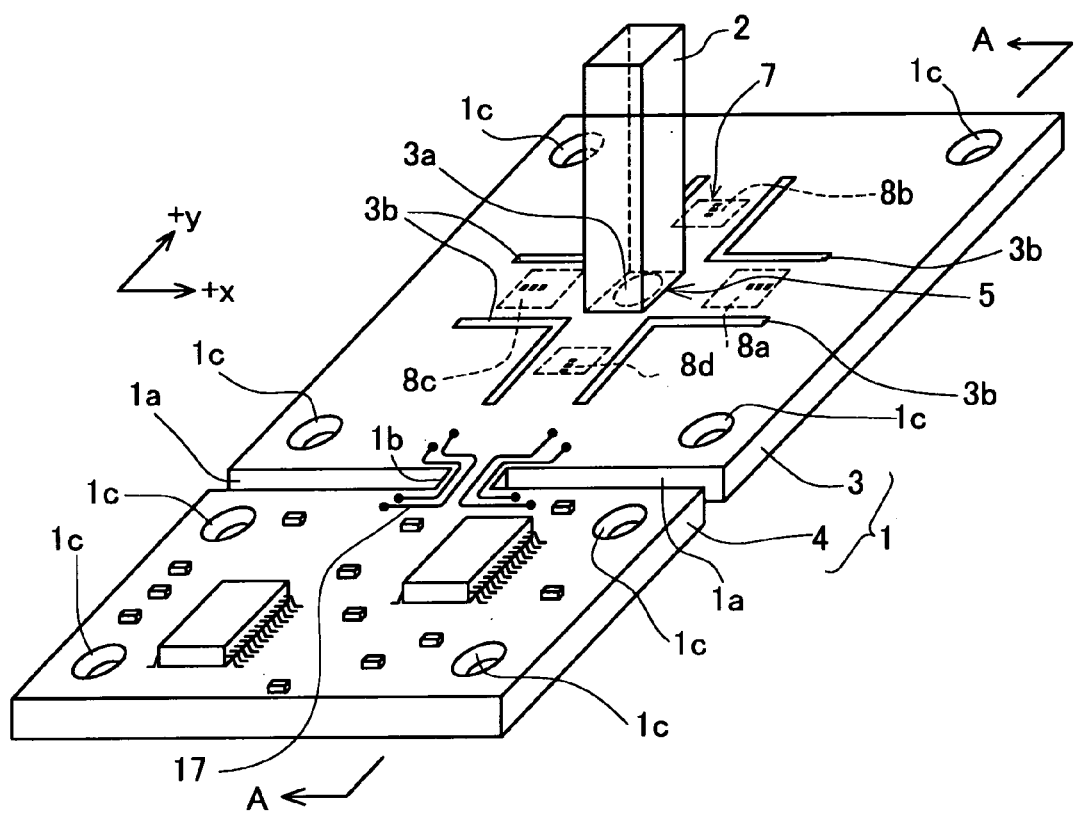
FIG. 10 is a perspective view of a pointing device in a modified example according to the present invention.
Figure 11:
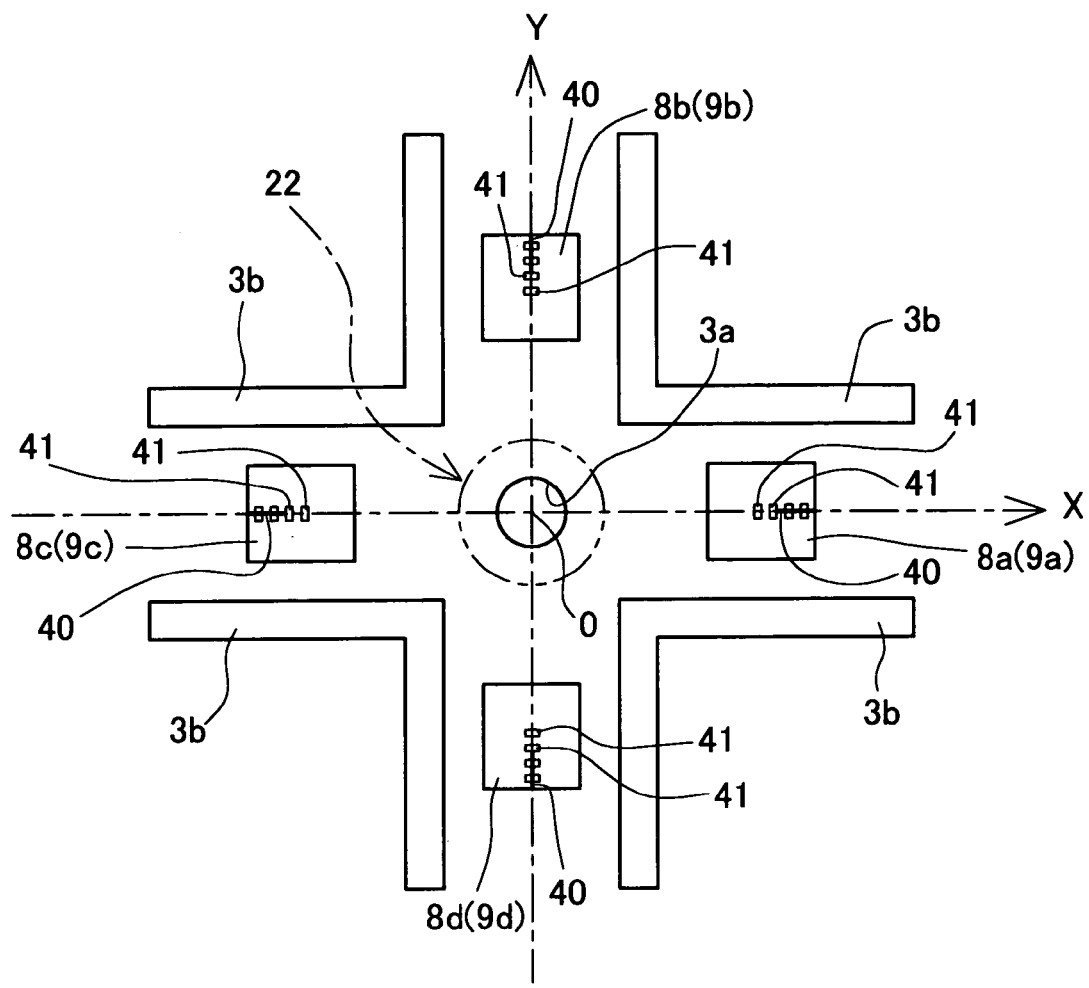
FIG. 11 is an explanatory view showing a positional relation of strain sensors and slits in the device of FIG. 10.
Figure 12:
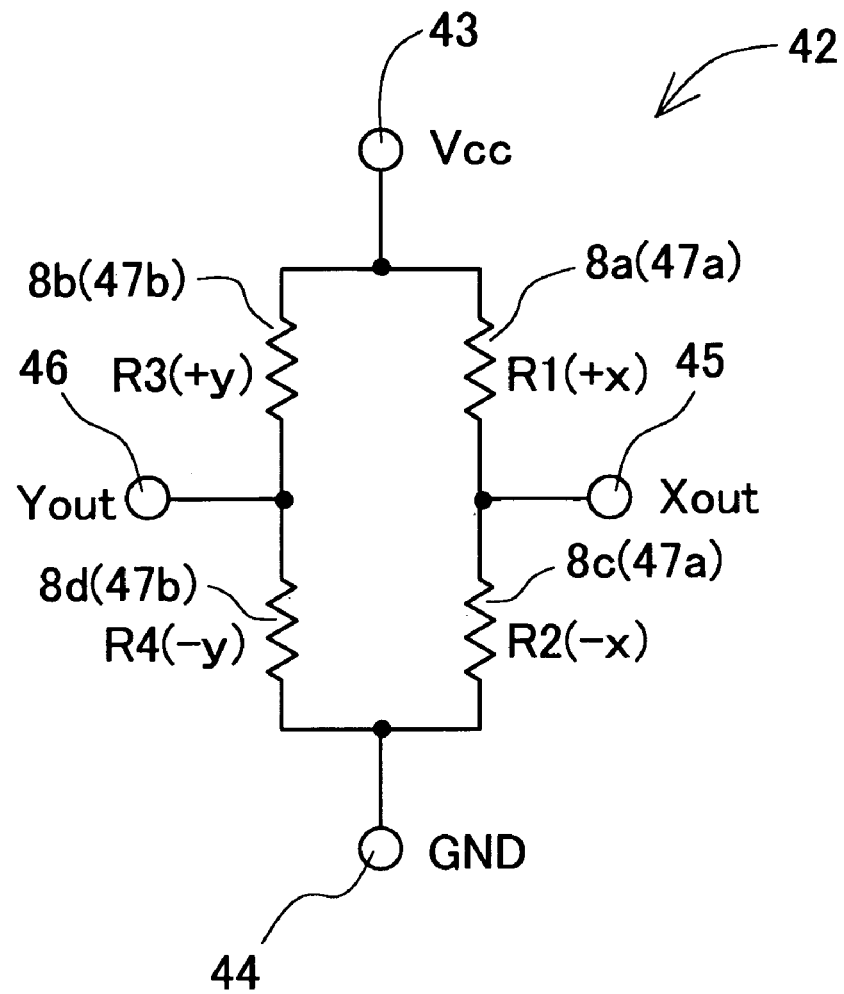
FIG. 12 is an explanatory view showing a connecting relation among strain sensors and chip resistances in the device of FIG. 10.
Figure 13:
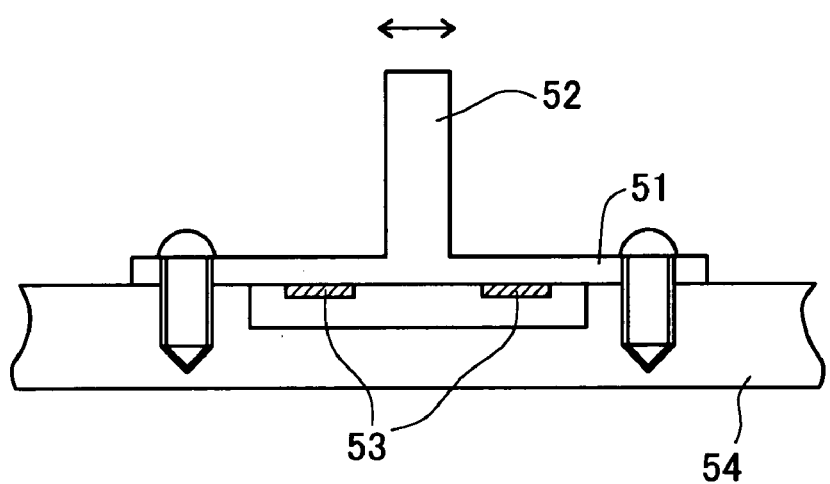
FIG. 13 is an explanatory view showing a pointing device in a prior art.
Figure 14:
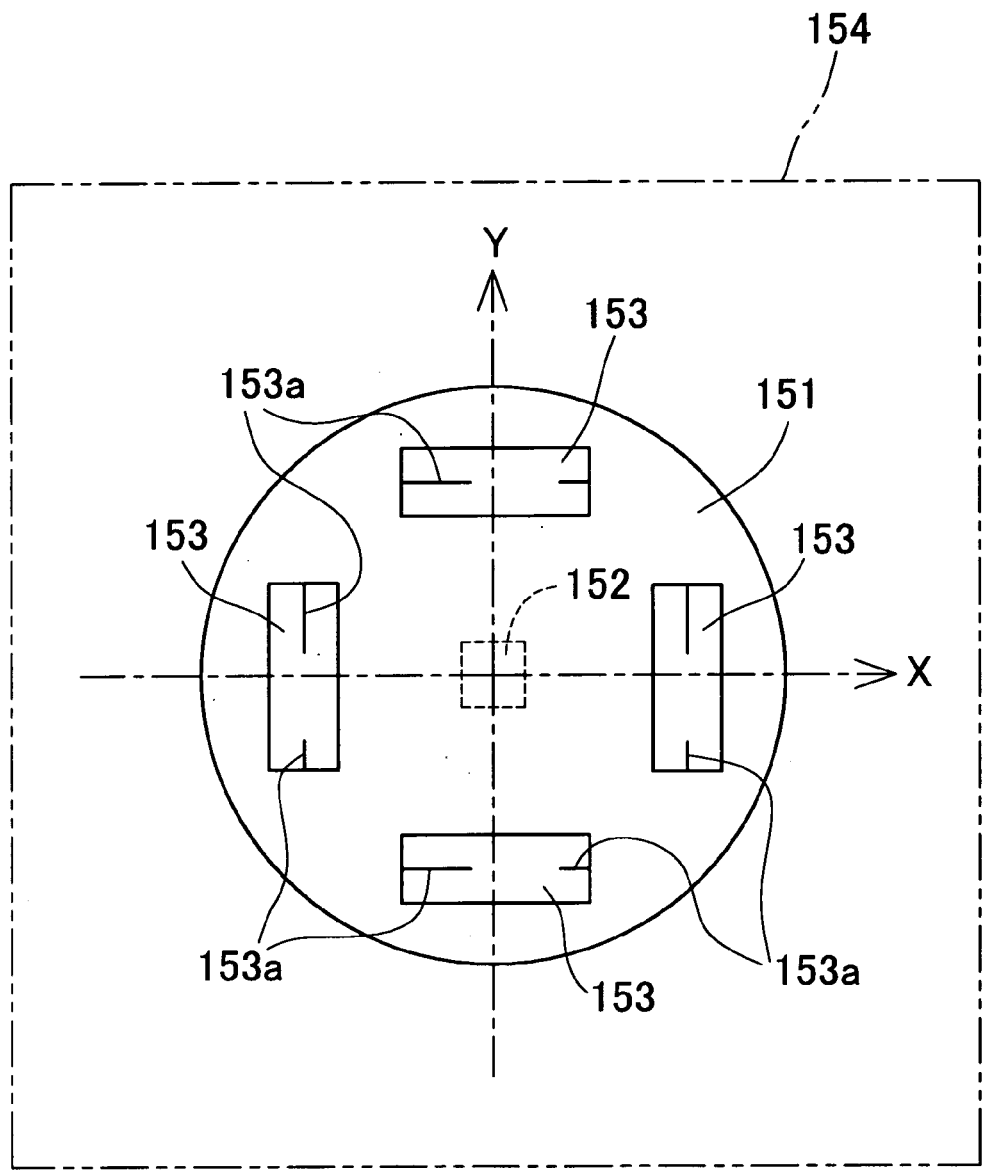
FIG. 14 is an explanatory view showing an arrangement state of strain sensors each formed with notches in another pointing device in the prior art.
Figure 15:
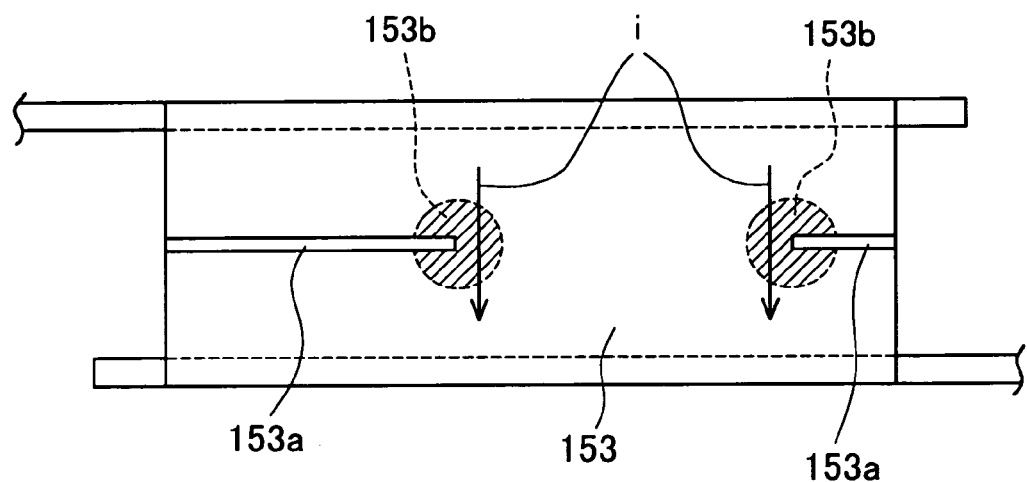
FIG. 15 is an explanatory view showing an area of unstable resistance due to thermal stress.

Moreover, the pointing device in the above embodiment may be modified as shown in FIGS. 10 to 12. In the pointing device in the above embodiment, the chip resistances 10$a$–10$d$ are arranged around the strain sensors 8$a$–8$d$ formed on the detecting section 3 of the sensor substrate 1 and separately from the sensors 8$a$–8$d$, and the notches 11$a$–11$d$ are formed in the chip resistances 10$a$–10$d$ by the trimming process using the laser beam to thereby adjust the resistance values of the chip resistances 10$a$–10$d$. On the other hand, this modified pointing device is structured such that each of the strain sensors 8$a$–8$d$ is formed with a plurality of windows where no electric resistance is present and a notch made along the alignment direction of the windows, without formation of the chip resistances 10$a$–10$d$. It is to be noted that other constituting elements or members are the same as those in the above embodiment, and the detailed description thereof is omitted. Only a specific structure to this modification example is explained below. Like elements or members corresponding to those in the above embodiment are indicated by like numerals.

As shown in FIG. 10, four strain sensors 8$a$ to 8$d$ are provided on the lower surface of the sensor substrate 1. These sensors 8$a$ to 8$d$ are arranged at 90° angle intervals with the strut member 2 being centered. To be more specific, assuming a coordinate system having an X coordinate axis, a Y coordinate axis, and an origin point O aligned to the center of the sensor substrate 1 at which the strut member 2 is attached, the strain sensors 8$a$–8$d$ are arranged at a side +X on the X coordinate axis, a side +Y on the Y coordinate axis, a side −X on the X coordinate axis, and a side −Y on the Y coordinate axis, in this order. The sensors 8a–8d are of symmetrical shape and thickness with respect to the corresponding X or Y coordinate axis, whereby to cancel the strain generated in symmetry with respect to the coordinate axis.

Each of the strain sensors 8a to 8d includes an electric resistance made of an electric resistance material such as ruthenium dioxide which changes its resistance value with stress applied thereto and a pair of electrodes connected to the resistance at both sides in the width direction thereof. The electrical resistance is formed by adhesion of the electrical resistance material to the sensor substrate 1 using layer forming techniques such as a thick-layer printing method, a vacuum deposition method, a sputter method, a vapor phase deposition method, or the like. In this way, each of the strain sensors 8a–8d is formed of the electrical resistance by the layer forming techniques under the same condition at the same time. Hence, the inconsistency in characteristics of the strain sensors 8a to 8d can be minimized, and the strain amount can be detected at high accuracy. It is to be noted that the strain sensors 8a to 8d may be formed by different manners from above, for example, printing techniques using conductive ink and photolithography techniques using photolithography and etching.

Furthermore, each of the strain sensors 8a–8d is formed with a notch 40 extending from an outer end in the longitudinal direction toward the center (the origin point O). The notch 40 is formed by a trimming process in which a laser beam is irradiated to scan, partially vaporizing and removing the electrical resistance.

In addition, the strain sensors 8a–8d are each formed with a plurality of rectangular windows 41 in which no electrical resistance is present, as shown in FIGS. 10 and 11. These windows 41 are formed by the patterning using printing or evaporation during formation of the electrical resistance before the trimming process. The windows 41 are arranged in aligned relation to the forming (or extending) direction of the notch 40. Because of the formation by patterning, many windows 41 can be arranged at closer intervals and the accuracy of digital resistance adjustment through the windows can also be enhanced. In one of the windows 41, the endpoint of the notch 40 is received to prevent a large amount of heat of the laser beam from being transmitted to the electrical resistance. Besides the rectangle, the shape of the window 41 may be selected from a triangle, polygon, circle, or a liner form disposed perpendicularly to the forming direction of the notch 40.

During the trimming process, the scanning distance of the laser beam is adjusted so that the endpoint of the notch 40 is within the window 41. Accordingly, even if a large heat amount of the laser beam is given at the terminal position of the laser scanning (i.e., the endpoint of the notch 40), such heat amount is directly given to the sensor substrate 1 having a small heat conductivity in the window 41. This can prevent the heat from being transmitted to the electrical resistance existing around the window 41. As a result of this, the electrical resistance around the endpoint of the notch 40 will not receive thermal stress caused by excessive temperature rise. Hence, the strain sensors 8a–8d can be maintained in a stable resistance state even after the trimming process.

It is preferable that the endpoint of the notch 40 is received in the window 41 as mentioned above, but may be at a position out of the window 41. This is because, when a large amount of heat of the laser beam is given to the electrical resistance existing between windows 41, the windows 41 block the transmission of the heat and therefore the widening of unstable resistance area due to the thermal stress can be suppressed to a minimum.

The strain sensors 8a to 8d constitute a bridge circuit 42 as shown in FIG. 12. That is, a power source terminal 43 to which a power supply voltage of 5V for example is applied is connected between the strain sensors 8a and 8b, and a GND terminal 44 is connected between the sensors 8d and 8c. An X-axis output terminal 45 is connected between the sensors 8a and 8c, and a Y-axis output terminal 46 is connected between the sensors 8b and 8d. The pair of sensors 8a and 8c arranged on the X coordinate axis and the X-axis output terminal 45 jointly constitute an X-side transducer 47a for detecting the amount or quantity of deformation in the X coordinate axis. The pair of sensors 8b and 8d arranged on the Y coordinate axis and the Y-axis output terminal 46 jointly constitute a Y-side transducer 47b for detecting the amount or quantity of deformation in the Y coordinate axis. Moreover, a combination of both the outputs from the transducers 47a and 47b constitutes a Z-side transducer for detecting the amount of strain in a Z coordinate axis.

As mentioned above, the pointing device in the modification example is provided with the stick member 22 vertically provided on the sensor substrate 1 of a flat board form, the pair of strain sensors 8a and 8c arranged in symmetrical relation to each other with respect to the stick member 22 on the sensor substrate 1, and the other pair of strain sensors 8b and 8d arranged at 90° angular intervals from the sensors 8a and 8c with the stick member 22 being centered. Each of these strain sensors 8a–8d is constructed to have the electrical resistance positioned between a pair of electrodes disposed in parallel to each other; the notch 40 formed in the electrical resistance by the trimming process using the laser beam; and the plurality of windows 41 which no electrical resistance exists in and are formed in advance in aligned relation to the forming direction of the notch 40.

Since the forming direction of the notch 40 is thus in agreement with the alignment direction of the windows 41, the endpoint of the notch 40 which is a stop position of the laser scanning is within the window 41 or between the adjacent windows 41. This window 41 having no electrical resistance acts to prevent the transmission of the heat to the surrounding area thereof. Therefore, even when a large amount of heat of the laser beam is given to the endpoint of the notch 40, the electrical resistance area which may be unstable as resistance due to the thermal stress can be reduced. Even when a temperature and an electric current are changed or physical noise is generated as external interference, for example, such external interference does not act as a noise element on the detected current of the strain sensors 8a–8d. Hence, the occurrence of malfunctions in the electronic device such as a personal computer can be sufficiently prevented.

In particular, the endpoint of the notch 40 is received within the window 41 in the modification example, so that the area of which resistance value is unstable is further reduced, thus making sure the prevention of malfunctions in the electronic device.

Since the pointing device constructed as above is mounted on a part of the operating face of the main unit including keys, a keyboard provided with the pointing device which hardly generates noises can be realized.

Moreover, the electronic device mounting thereon the pointing device in the modification example can minimize the occurrence of malfunctions.

The present invention may be embodied in other specific forms without departing from the essential characteristics thereof. For instance, in the modification example, four strain sensors 8a to 8d are used to detect the amount of strain of the sensor substrate 1, but not limited thereto. It is sufficient if only the pointing device is provided with at least a pair of strain sensors disposed in symmetrical relation to each other with respect to the stick member 22.

The notch 40 in the modification example is formed from an end in the longitudinal direction of the strain sensors 8a–8d, but not limited thereto. Alternative design is to form two notches 40 extending from both ends in each of the strain sensor 8a–8d.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pointing device including:
   a sensor substrate having a flat board form;
   a stick member vertically provided on one surface of the sensor substrate, a portion of a bottom surface of the stick member in direct contact with the one surface of the sensor substrate;
   first and second pairs of strain sensors formed on another surface of the sensor substrate that is opposite to the one surface on which the stick member is provided, the strain sensors in the first pair and the second pair being respectively arranged in symmetrical relation to each other with respect to the stick member; and
   slits formed in the sensor substrate, each slit being constructed from a first slit portion positioned at a side of one of the strain sensors in the first pair and a second slit portion positioned at a side of one of the strain sensors in the second pair, the first slit portion and the second slit portion being connected to form the slit in an L-shape.

2. The pointing device according to claim 1, wherein the sensor substrate is made of a flexible insulative material.

3. The pointing device according to claim 2, wherein the strain sensor is made of a resistance material which changes its resistance value with stress applied to the strain sensor.

4. The pointing device according to claim 3, wherein the resistance material is formed adhering onto the insulative material by a layer forming technique.

5. The pointing device according to claim 4, wherein the layer forming technique is selected from among a vacuum deposition method, a sputter method, and a vapor phase deposition method.

6. The pointing device according to claim 3, wherein the resistance material is a material mainly composed of carbon.

7. The pointing device according to claim 1, wherein the strain sensors in the second pair are arranged in a direction perpendicular to a line connecting the first pair of strain sensors while passing through a center of the stick member, and
   wherein the strain sensors in both the first and the second pairs are arranged at 90° angular intervals around the stick member.

8. The pointing device according to claim 7, wherein the first slit portions and the second slit portions are respectively provided at both sides of each of the strain sensors, and the first and second slit portions which are connected are formed between the strain sensors adjacently arranged.

9. The pointing device according to claim 8, wherein four L-shaped slits are formed at 90° angular intervals around the stick member and the four L-shaped slits jointly form a cross-shaped intersecting area.

10. The pointing device according to claim 9 further including chip resistances capable of being trimmed, connected in series with the strain sensors correspondingly and arranged out of the intersecting area on the sensor substrate.

11. The pointing device according to claim 1, wherein the sensor substrate includes:
    a strain detecting substrate section on which the stick member and the strain sensors in both the first and the second pairs are disposed, the strain detecting substrate section detects an amount of strain on the strain detecting substrate section by means of the strain sensors, the strain being caused by operation of the stick member directly on the strain detecting substrate section; and
    a signal processing substrate section for signal processing the strain amount of the sensor substrate detected by the strain detecting substrate section;
    wherein the strain detecting substrate section and the signal processing substrate section are connected through a connecting substrate section that is narrower in width than both the strain detection substrate section and the signal processing substrate section.

12. The pointing device according to claim 1, further including:
    an engagement portion protruding from a lower end of the stick member;
    an attachment hole formed in the sensor substrate, in which the engagement portion is inserted; and
    a fixing member for fixing the engagement portion of the stick member inserted in the attachment hole, the fixing member being attached from the another surface of the sensor substrate;
    wherein the stick member is vertically provided on the sensor substrate in an engagement relation thereto.

13. A keyboard provided with a plurality of keys arranged on a keyboard substrate and a pointing device mounted on a part of an operating face of the keyboard, the pointing device including:
    a sensor substrate having a flat board form;
    a stick member vertically provided on one surface of the sensor substrate so as to protrude upward from the one surface, a portion of a bottom surface of the stick member being in direct contact with the one surface of the sensor substrate;
    first and second pairs of strain sensors formed on another surface of the sensor substrate that is opposite to the one surface on which the stick member is provided, the strain sensors in the first pair and the second pair being respectively arranged in symmetrical relation to each other with respect to the stick member; and
    slits formed in the sensor substrate, each slit being constructed from a first slit portion positioned at a side of one of the strain sensors in the first pair and a second slit portion positioned at a side of one of the strain sensors in the second pair, the first slit portion and the second slit portion being connected to form the slit in an L-shape.

14. An electronic device provided with a keyboard including: a plurality of keys arranged on a keyboard substrate and a pointing device mounted on a part of an operating face of the keyboard; a controller for controlling various data input with the keys on the keyboard; and a display for displaying the data under control by the controller;

wherein the pointing device includes:

a sensor substrate having a flat board form;

a stick member vertically provided on one surface of the sensor substrate so as to protrude upward from the one surface, a portion of a bottom surface of the stick member being in direct contact with the one surface of the sensor substrate;

first and second pairs of strain sensors formed on another surface of the sensor substrate that is opposite to the one surface on which the stick member is provided, the strain sensors in the first pair and the second pair being respectively arranged in symmetrical relation to each other with respect to the stick member; and slits formed in the sensor substrate, each slit being constructed from a first slit portion positioned at a side of one of the strain sensors in the first pair and a second slit portion positioned at a side of one of the strain sensors in the second pair, the first slit portion and the second slit portion being connected to form the slit in an L-shape.

15. The pointing device according to claim 3, wherein each of the strain sensors is formed with a plurality of windows in which the resistance material is absent, the windows being arranged in aligned relation to a line connecting the pair of the strain sensors while passing through a center of the stick member, and also each of the strain sensors is formed with a notch which is made by a trimming process of irradiating a laser beam to the strain sensor along the alignment direction of the windows.

16. The pointing device according to claim 15, wherein the trimming process makes the notch so that an endpoint of the notch is received within the window.

17. The pointing device according to claim 15, wherein the resistance material is formed adhering onto the insulative material by a thick layer printing technique.

18. The pointing device according to claim 17, wherein the resistance material is a ruthenium material.

19. The pointing device according to claim 18, wherein the ruthenium material is ruthenium dioxide.

20. The pointing device according to claim 11, wherein the connecting substrate section is produced by formation of cut-out portions from both sides of the sensor substrate in its width direction toward a center thereof.

* * * * *